United States Patent Office 2,696,490
Patented Dec. 7, 1954

2,696,490

PREPARATION OF STEROIDS OF THE $C_{19}$ SERIES

Percy L. Julian, Oak Park, and William J. Karpel, Chicago, Ill., assignors to The Glidden Company, Cleveland, Ohio, a corporation of Ohio No Drawing. Application May 26, 1953,
Serial No. 357,634

12 Claims. (Cl. 260—397.5)

The present invention relates to production of steroids of the $C_{19}$ series and is particularly concerned with their preparation from steroids of the $C_{21}$ series.

Steroids of the $C_{19}$ series are generally prepared on a commercial scale by the oxidation of sterols, such as stigmasterol, cholesterol, sitosterol and the like. The degradation of the side chain of such compounds to compounds of the $C_{19}$ series, however, is a more or less random oxidation. The preparation of steroids of the $C_{21}$ series, such as pregnenolone, however, is a more controllable reaction since there are numerous natural materials such as stigmasterol, and the genins, which can be degraded by stepwise controllable reactions. A practical method for conversion of such $C_{21}$ steroids to $C_{19}$ steroids would accordingly provide a stepwise method for preparing $C_{19}$ steroids from more abundant natural materials.

It is accordingly an object of the invention to provide a new and novel process for preparing steroids of the $C_{19}$ series.

Another object is to prepare $C_{19}$ steroids from $C_{21}$ steroids.

A further object is to prepare 17-oxygenated steroids of the $C_{19}$ series from 20-keto steroids of the $C_{21}$ series.

An additional object is to prepare 17-oxygenated steroids of the $C_{19}$ series from steroids possessing a

attached to the 17-position of the nucleus, wherein R is lower alkyl radical.

Other objects will appear from the following description.

It has been found that the foregoing objects can be accomplished by treating 20-keto steroids with perbenzoic acid. Preferably any carbon-carbon double bonds in the molecule are temporarily protected such as by addition of $Br_2$, $Cl_2$, HCl, etc. unless the epoxy compounds formed and/or their derivatives are desired.

Any 20-keto steroid can be used, whether of the pregnane, allopregnane or pregnene series, as well as homologues thereof, such as the alkyl ketones described in the Julian et al. Patent No. 2,342,147.

The reaction involved can be illustrated by the following equations:

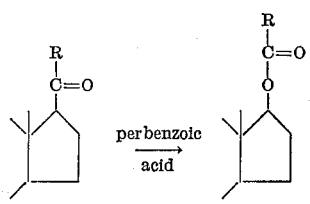

Thus, when R is a methyl group, such as in pregnenolone, the product is an acetate. However, by employing homologs in which R is other than the methyl group, the propionate can be prepared.

The process is of particular value in the preparation of testosterone and its esters. Thus, when starting with pregnenolone dibromide, the product of the perbenzoic acid oxidation can be oxidized with chromic acid and upon debromination of this oxidation product, testosterone acetate is obtained.

The following examples are illustrative.

Example 1

Dissolve 158 g. pregnenolone in 1000 cc. dry chloroform. Cool the solution to 5° C. and add a cold solution of 25.7 cc. bromine (80.16 g.) in 275 cc. of chloroform. The bromine solution is added rapidly to the cooled solution of pregnenolone with good agitation. After the addition of bromine, let stand for 5 minutes.

Transfer the solution to a separatory funnel and wash the chloroform solution successively with 350 cc. of 2% NaOH, 350 cc. $H_2O$, 250 cc. of 2% $H_2SO_4$, 350 cc. $H_2O$, 350 cc. $H_2O$. Dry the solution with $Na_2SO_4$ and filter.

The chloroform is removed under vacuo at a temperature not exceeding 40° C. until a thick residue of the dibromo-pregnenolone remains.

To the dibromo-pregnenolone residue is added a benzene solution of perbenzoic acid containing 138 g. of peracid (2 moles). The volume of the peracid solution used depends upon the peracid content and usually ranges between 2500 and 3500 cc.

After complete solution of the dibromide, the benzene solution is concentrated under vacuo at a temperature not exceeding 30° C. to a volume of 1580 cc., i. e., 10:1 based on the original pregnenolone.

Then the perbenzoic acid content at the beginning and during the rearrangement is determined by titrating the amount of iodine liberated from KI by a sample. During the reaction the solution is kept in the dark and at temperatures between 25° C. and 35° C. (room temperature). Sampling and titrations are made at regular intervals. When titration indicates that at least 1.8 moles of perbenzoic acid have been consumed, the reaction is stopped. This usually requires three to five days and is mainly dependent upon the temperature.

The solution is transferred to a separatory funnel and diluted with 800 cc. ether. The solution is washed with 10% NaOH to destroy remaining perbenzoic acid and to remove benzoic acid from the solution. This is followed by water washes to neutrality.

The benzene-ether solution is concentrated under vacuum at a temperature not to exceed 40° C. until a thick yellow syrup remains. The residue is dissolved in 1900 cc. of glacial acetic acid, and oxidized by the addition of a solution of 67 g. $CrO_3$ (2 moles) in 60 cc. $H_2O$ and 500 cc. acetic acid. The $CrO_3$ solution is added to a stirred solution of the rearrangement products maintaining the temperature between 20° and 30° C. The oxidation mixture is then allowed to stand for 3 hours at 25° to 30° C.

The excess $CrO_3$ is destroyed by the addition of 65 cc. of methanol containing 2 cc. of concentrated sulfuric acid and allowed to stand for one hour.

The oxidation mixture is diluted with 1200 cc. acetic acid and under $CO_2$ treated with 3200 cc. of 1 molar chromous chloride solution. The flask is stoppered and allowed to stand for four hours or overnight. Then the solution is heated and concentrated under vacuum to remove most of the acetic acid. The remaining liquor is diluted with water and extracted twice with ether. After washing with water to remove the chromic salts and any acetic acid, the ether solution is washed with 10% NaOH to remove the acidic fraction. After washing to neutrality with water, the ethereal solution is concentrated and taken to dryness under vacuum. The weight of material obtained as a yellowish oil at this point is about 125 grams.

The residue is dissolved in 1000 cc. methanol containing 60 grams of KOH and hydrolyzed by refluxing for 2 hours. Then at least one-half of the volume of methanol is removed under partial vacuum. The remaining solution is diluted with ether and then with 5000 cc. water. The products are extracted twice with ether and the ether solution washed alkali-free. After drying with $Na_2SO_4$, the ethereal solution is concentrated to about 250 cc. volume. Upon concentration, testosterone crystallized from the solution. The solution is cooled and then filtered and the crude testosterone washed will with cold ether. The yield of crude testosterone is about 60—63 grams melting at 145–150° C.

The filtrate and washes are taken to dryness under vacuum. There remains about 40 grams of residue.

The residue is treated with 40 grams succinic anhydride and 120 cc. pyridine and the mixture is heated for 2 hours on the steam cone after complete solution results. The mixture is then allowed to stand several hours or overnight.

The pyridine solution is diluted with ether and transferred to a separatory funnel. The ethereal solution is washed with 10% sulfuric acid until free of pyridine. After washing the ethereal solution with water, the hemisuccinate fraction is extracted with 10% sodium carbonate solution.

The ethereal solution containing the neutral fraction (ketonic) is washed with water, dried with $Na_2SO_4$ and concentrated to dryness. Weight of neutral fraction is about 10 grams and is crystallized from ether-petroleum ether to obtain progesterone. Yield of crude progesterone is about 5 grams melting at 110–122° C.

The sodium carbonate extract of the hemisuccinate fraction is acidified with 10% sulfuric acid in the presence of ice. The precipitated gummy hemisuccinate fraction is extracted with ether; the ether solution washed with water and concentrated. The hemisuccinate of testosterone is crystallized from ether-petroleum ether. Yield of hemisuccinate is about 10–12 grams melting at 175–180° C.

The hemisuccinate is hydrolyzed by refluxing for 90 minutes in 10% methanolic KOH. After dilution with water, the testosterone is extracted with ether and isolated by crystallization from ether. The yield of crude testosterone is about 70% by weight of the hemisuccinate.

The yield of products from pregnenolone (158 grams) is:

| | Grams |
|---|---|
| Crude testosterone: | |
| First crop | 63.0 |
| From succinate | 8.0 |
| Total | 71.0 |
| Yield by weight, 44.9%. | |
| Yield by theory, 49.3%. | |
| Crude progesterone: | |
| First crop | 5.0 |
| Yield by weight, 3.0%. | |
| Yield by theory, 3.0%. | |

*Example 2*

6.36 g. (.02 mole) allopregnanolone is dissolved in 90 cc. of a benzene solution containing 5.5 g. perbenzoic acid (2 moles). The perbenzoic acid content is determined by titrating with thiosulfate the amount of iodine liberated from acidified KI solution by a sample of the benzene solution. The benzene solution is kept in the dark at room temperature between 25°–32° C.

Sampling and titrations are made at regular intervals, when the perbenzoic acid content as indicated by titration had shown that at least 1.8 moles had been consumed, the reaction is stopped. Three days were required to complete the reaction.

The reaction mixture is worked up by diluting with 40 cc. ether and washed in a separatory funnel with 10% NaOH to remove unchanged perbenzoic acid and the benzoic acid formed during the reaction. The ethereal solution is washed with water, dried and concentrated to a syrup.

The syrup is taken up in 75 cc. glacial acetic acid and oxidized by the addition of a solution of 2.7 g. $CrO_3$ (2 moles) in 3 cc. water and 15 cc. glacial acetic acid. The temperature of the oxidation mixture is maintained at 25 to 30° C. and allowed to stand thusly for 3 hours. The excess $CrO_3$ is destroyed by the addition of 3 cc. methanol containing 2 drops concentrated $H_2SO_4$ and allowed to stand for one hour. The oxidation mixture is now concentrated under vacuo by heating on the steam cone to remove most of the acetic acid. The remaining liquor is now diluted with water and extracted twice with ether. The ethereal solution is washed with water and then 10% sodium hydroxide solution to remove the acid fraction. (The alkali portion on acidification and extraction with ether, washing and concentration and crystallization yields 0.65 g. crystalline acid, M. P. 248–255° dec.)

The neutral ethereal solution is water washed to neutrality, dried and concentrated to yield a crystalline residue weighing 5.1 g.

The 5.1 g. residue (which is practically insoluble in methanol) is hydrolyzed in 40 cc. methanol containing 2.4 g. KOH (5% solution) by refluxing for two hours. The material is immediately soluble on contact with the alkaline solution. The hydrolysis mixture is worked up by diluting with water and extracting with ether. The yield of material at this point is 2.1 grams.

The 2.1 g. residue is treated with 2.1 g. succinic anhydride and 6 cc. pyridine and the mixture is heated for 2 hours on the steam cone. After standing several hours, the pyridine solution is diluted with ether and washed with 10% $H_2SO_4$ to remove pyridine. The ethereal solution is washed with water and the hemisuccinate fraction is extracted with 10% $Na_2CO_3$ solution.

The ethereal solution containing the neutral fraction is washed with water, dried and concentrated. Weight is 1.1 gram.

The sodium carbonate extract of the hemisuccinate fraction is acidified with 10% $H_2SO_4$ in the presence of ice. This mixture is now ether extracted, washed with water, dried and concentrated. A crystalline hemisuccinate fraction was not obtained. Weight is 1.4 gram.

*Example 3*

To 2 grams of pregnenolone acetate dichloride was added 15.1 cc. of a solution of perbenzoic acid prepared according to Organic Synthesis, vol. I, p. 431, and the mixture allowed to stand at room temperature. After 10 days titration indicated that no further reaction was taking place. The reaction mixture was poured into 5% NaOH and extracted with ether. The ethereal solution was water washed to remove unreacted perbenzoic acid as the sodium salt. The solution was water washed, dried and concentrated. Crystallization from ether-petroleum ether took place readily with a yield of first crop of crude 5,6-dichloroandrostanediol-3,17-diacetate of 0.5 gram, M. P. 182–185° (dec.).

The mother liquor yielded 0.8 g. of material melting at 122–128° without decomposition. This material was dissolved in 80 cc. of methanol containing 0.8 cc. of concentrated sulfuric acid and the mixture refluxed for 2 hours, cooled and precipitated with water. The precipitate was partly crystalline and partly gum. The precipitate was dissolved in 30 cc. of acetic acid. 43 grams of $CrO_3$ in 1.5 cc. water and 15 cc. acetic acid was added and the mixture allowed to stand at room temperature for 5 hours. The excess chromic acid was destroyed with methyl alcohol and the mixture then treated with 30 cc. of 1 molar chromous chloride solution. The oxidized material was then worked up as above. Upon crystallization from ether-petroleum ether, 0.2 g. of material was obtained, M. P. 163–166° C., and which gave no depression of the melting point on mix-melting with an authentic sample of androstenedione. It thus appears that the material obtained from the mother liquor contained low melting dichloride diacetate isomer.

In all of the foregoing examples, the perbenzoic acid was prepared in accordance with the method described in Organic Synthesis (2nd ed.), vol. I, p. 431.

It will be appreciated that many variations in the foregoing examples can be employed without departing from the invention. Thus other esters than the 3-acetate, such as the propionate, butyrate, benzoate, etc., can be employed if desired.

Having described the invention, what is claimed is:

1. The process for producing a steroid of the $C_{19}$ series which comprises subjecting a steroid of the 10,13-dimethyl-20-keto steroid having in the 3-position a group selected from the class consisting of the hydroxy group and the hydroxy group esterified with a carboxylic acid to the action of perbenzoic acid in the absence of esterifying agents, and recovering a steroid of the $C_{19}$ series containing an esterified hydroxy group in the 17-position from the reaction mixture.

2. The process of claim 1 in which the starting material is a steroid of the pregnane series.

3. The process of claim 1 in which the starting material is a 5,6-dihalo pregnane.

4. The process of claim 1 in which the starting material is a 3-hydroxy compound.

5. The process of claim 1 in which the starting material is a 5,6-dihalo pregnanolone.

6. The process of claim 1 in which the starting material is 5,6-dichloro-pregnanolone.

7. The process of claim 1 in which the starting material is 5,6-dichloro-pregnanolone acetate.

8. The process of claim 1 in which the starting material is pregnanolone.

9. The process for the preparation of a compound of the androstane series, which comprises subjecting a member selected from the group consisting of nuclearly saturated 3-hydroxy-20-keto-pregnanes and nuclearly unsaturated 3-hydroxy-20-keto-pregnanes, the double bonds of which are temporarily protected, to the action of perbenzoic acid in the absence of an esterifying agent, and separating the resulting products.

10. The process of claim 9 in which the treatment with perbenzoic acid is carried out at room temperature, and in the absence of an added catalyst.

11. The process for the preparation of a compound of the androstane series, which comprises subjecting a nuclearly unsaturated 3-hydroxy-20-keto-pregnane to the action of perbenzoic acid in the absence of an esterifying agent and with temporary protection of the double bond, the reaction being carried out at room temperature and in the absence of an added catalyst, and separating the resultant products.

12. The process for the preparation of a compound of the androstane series, which comprises subjecting $\Delta^{5,6}$-3-hydroxy-20-keto-pregnane to the action of perbenzoic acid in the absence of an esterifying agent and with temporary protection of the double bond the reaction being carried out at room temperature in the absence of an added catalyst, and separating the resultant products.

References Cited in the file of this patent

UNITED STATES PATENTS

| Number | Name | Date |
|---|---|---|
| 2,598,648 | Miescher | May 27, 1952 |